Aug. 19, 1930.　　　　K. ADAMS　　　　1,773,159
LIFTING DEVICE FOR VEHICLES
Filed June 16, 1927
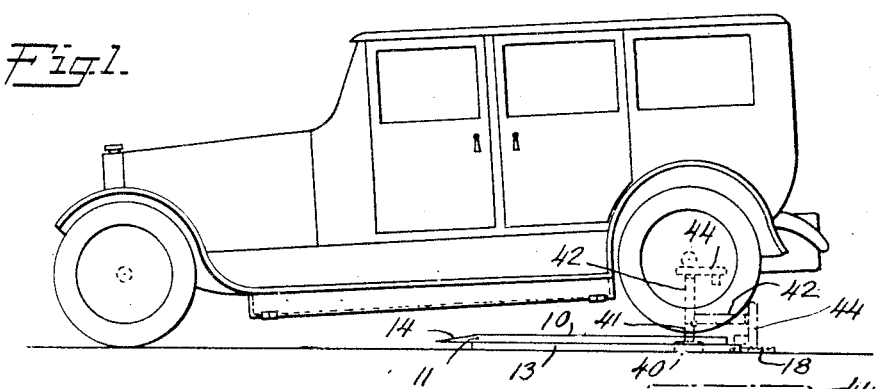
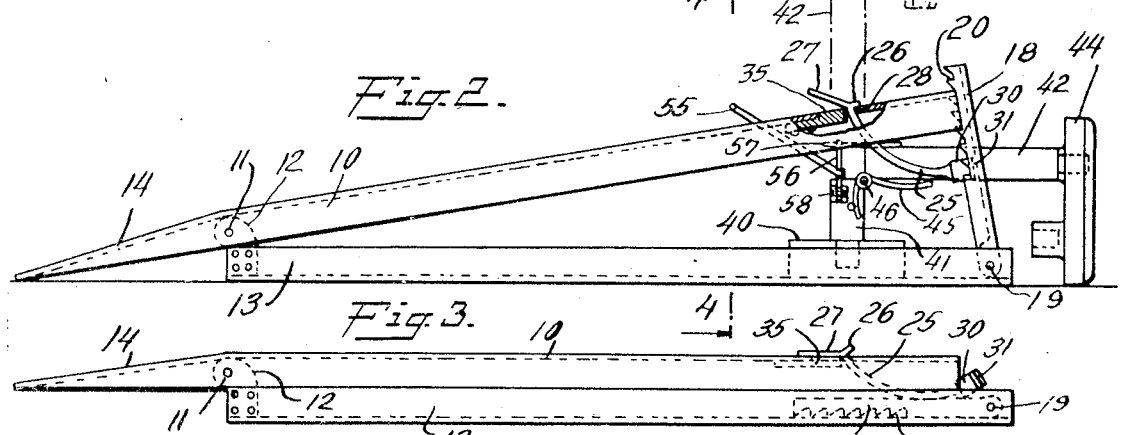
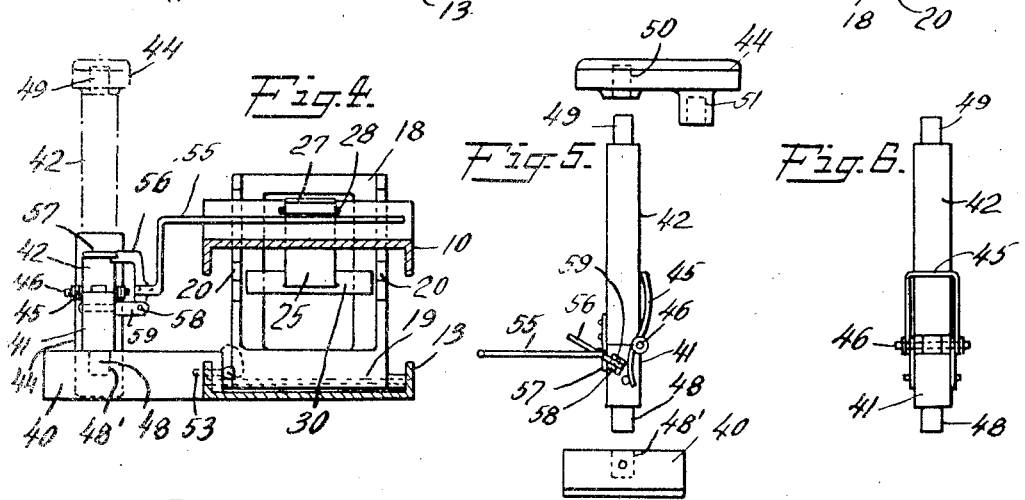
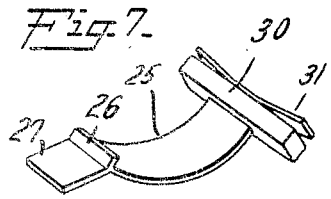
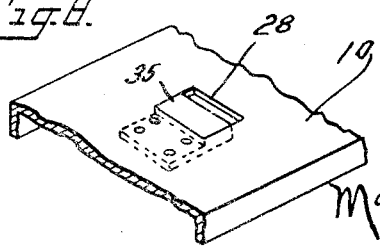
INVENTOR
Kempton Adams
BY
Marshall & Hawley
ATTORNEYS Patented Aug. 19, 1930

1,773,159

UNITED STATES PATENT OFFICE

KEMPTON ADAMS, OF REDDING RIDGE, CONNECTICUT

LIFTING DEVICE FOR VEHICLES

Application filed June 16, 1927. Serial No. 199,201.

This invention relates to a lifting device for vehicles.

It is a well known fact that the usual automobile lifting jack is difficult and unwieldy to manipulate.

This invention relates to a device so constructed and arranged that the vehicle will be lifted by its own power and the invention has for its salient object to provide a simple and practical device for accomplishing this end in such a manner that no manual manipulation of the device is necessary to lift or lower the vehicle.

Another object of the invention is to provide a lifting device so constructed and arranged that a vehicle can be backed over the device and will automatically release the pedestal on which the axle is to be supported.

Further objects of the invention will appear from the following specification taken in connection with the drawings, which form a part of this application, and in which Fig. 1 is an elevational view illustrating a motor vehicle having its rear axle supported on the pedestal;

Fig. 2 is an elevational view partly in section of the device, the pedestal being shown in full lines in inoperative position and in dotted lines in supported position;

Fig. 3 illustrates the device in folded position;

Fig. 4 is a transverse sectional elevation taken substantially on line 4—4 of Fig. 2;

Fig. 5 is a side elevation illustrating the construction of the pedestal;

Fig. 6 is an elevational view taken at right angles to Fig. 5, showing the central or main body portion of the pedestal;

Fig. 7 is a perspective view of the trip device for freeing the track supporting member; and Fig. 8 is a perspective view showing the portion of the track on which the trip device is mounted.

The invention briefly described consists of a lifting device comprising two essential parts, namely, an inclined track adapted to support the vehicle wheel and to raise the wheel and the end of the axle on which the wheel is mounted as the wheel travels upwardly on the track, and a pedestal or support adapted to engage the vehicle axle and to support the axle after the track has been automatically released. The pedestal is normally disposed in inoperative position in order to be out of the path of any depending parts of the vehicle or chassis when the wheel is traveling upwardly on the track. Means is provided for automatically releasing the pedestal, whereupon the pedestal will be swung to operative position. This releasing means in the form of the invention illustrated consists of a tripping means engageable by the wheel as it travels upwardly on the track. Means is also provided for automatically releasing the track supporting means when the pedestal has been raised and the wheel has reached a position in which the axle is disposed above and in a position to be supported by the pedestal. In the form of the invention shown this means is also engageable by the wheel. Further details of the invention will appear from the following description.

In the particular embodiment of the invention illustrated in the drawings, there is shown a track 10, preferably formed of channel iron, and hinged at 11 to lugs 12 disposed at one end of a base 13, also preferably formed of channel iron. The track 10 has an inclined extension 14 which projects beyond the hinge 11.

At its opposite end the track 10 is engaged by a bar 18 pivoted at 19 to the base and having a plurality of teeth 20 formed thereon. The bar 18 is preferably formed of channel iron and both flanges have correspondingly located or alined teeth 20. Since a plurality of sets of teeth are provided, the track can be supported at any desired inclination, thus adapting the track for any sizes of tires and wheels.

A trip device is provided for releasing the supporting bar 18 when the wheel has reached a position in which the axle is disposed above the pedestal and in a position to be supported thereby. This device comprises a curved arm or bar 25 having a tread at one end thereof comprising a lug 26 and a plate 27. The trip device is pivoted in a slot 28 formed in the track 10 and at the end opposite the end having secured thereto the tread there is mounted a transversely extending bar 30 having secured to its outer face a spring strip 31, the two ends of the strip 31 being bent outwardly as shown in Fig. 7. In order to facilitate the mounting of the trip device on the track, the slot 28 is made relatively wide but after the device is mounted as shown in Fig. 2 a plate 35 is secured to the under surface of the track and closes a portion of the slot, the slot being left wide enough to permit free tilting movement of the device on the track.

As shown in Fig. 2, the lug 26 so positions the trip device that the spring strip 31 will engage the inner surface of the pivoted supporting bar 18. It will be evident that when the wheel travels upwardly on the track and engages the tread 27, the trip device will be tilted and the lower end thereof will be raised, thus freeing the end of the track from the teeth 20 in the bar 18. The spring 31 will function to force the bar away from the track after the track is released from the teeth, thus preventing the track from engaging and possibly breaking the teeth as the track falls on the base 13.

The pedestal for supporting the axle comprises three main parts, a base 40, a supporting post or body portion comprising hinged sections 41 and 42, and a head 44. A spring 45 is mounted on the hinge pin 46 and tends to swing the upper section 42 to a position in alinement with the lower section 41. The lower section 41 of the post has a reduced extension 48 adapted to enter a socket 48' formed in the base and to be secured therein in any suitable manner, as by a cotter-pin. The upper section 42 of the post has an extension 49 which is adapted to enter either one of two sockets 50 or 51 formed in the head 44. It will be evident that when the vehicle has a relatively low axle the extension 49 will be inserted in the socket 50 and when the axle is spaced a greater distance from the ground the extension 49 will be inserted in the socket 51.

The base 40, as shown clearly in Fig. 4, is disposed at one side of the base 13 of the track and is preferably secured thereto by some suitable means, such as a cotter-pin 53 which passes through the side channels of both bases.

In certain vehicles there are members which extend downwardly to such an extent that if the pedestal were initially disposed in elevated position these depending parts would engage the pedestal and prevent the vehicle from being backed upwardly on the track 10. In order to provide for this contingency the two sections 41 and 42 of the post are hinged and means is provided for retaining the section 41 in the depressed position shown in full lines in Fig. 2 until the vehicle has reached a position to be supported by the pedestal.

The trip means for releasing the pedestal consists of a lever having an elongated portion 55 positioned as shown in Figs. 2 and 4 above the track and a latch portion 56 adapted to engage beneath a plate 57 secured to the lower end of the section 42 on the side opposite the pivoted side of this section. The lever is pivoted at 58 to a lug 59 swiveled to the lower section 41 of the post.

The section 42 of the post is normally held in depressed position by the latch lever but when the vehicle wheel engages the portion 55 of the lever the lever will be swung in a clockwise direction viewing Fig. 4 and the section 42 will be swung upwardly by the spring 45 to the position shown in dot and dash lines in Fig. 2.

*Operation*

When a vehicle axle is to be supported to permit the removal of a flat tire or for any other reason, the wheel of the vehicle is backed up the track 10 which has previously been raised to the proper inclination and is supported by the bar 18. The section 42 of the pedestal post will be depressed to the position shown in full lines in Fig. 2 and will be held in depressed positon by the latching lever. When the wheel has traveled upwardly on the track to a sufficient extent to engage the portion 55 of the latching lever, the lever will be swung about its pivot, thus releasing the section 42 of the pedestal post, permitting the section and the head to swing upwardly to the position shown in dot and dash lines in Fig. 2. The continued travel of the wheel up the track will cause the wheel to engage the tread 27, thereupon depressing the tread and swinging the arm 25 in an anticlockwise direction viewing Fig. 2. This movement of the arm will force the track supporting bar 18 away from the end of the track and the spring 31 will insure the movement of the bar 18 to a sufficient extent to provide clearance between the teeth 20 and the end of the track. When the bar 18 is swung outwardly, causing the track 10 to fall, the axle of the vehicle will be supported on the head 44 of the pedestal. After the desired repairs have been made a slight rearward movement of the vehicle will cause the section 42 of the pedestal post to swing on its pivot and the axle will be freed from the pedestal.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A lifting device comprising a track, means for supporting the track in inclined position, a pedestal, a latch for holding the pedestal in inoperative position, and means engageable by a wheel on the track for releasing said latch.

2. A lifting device comprising a track, means for supporting the track in inclined position, a pedestal, a latch for holding the pedestal in inoperative position, and means disposed above the track and engageable by a wheel on the track for releasing said latch.

3. A lifting device comprising a track, means for supporting the track in inclined position, a hinged pedestal, means for moving the pedestal to operative position, a latch for holding the pedestal in inoperative position, and means engageable by a wheel on the track for releasing said latch.

4. A lifting device comprising a track, means for supporting the track in inclined position, a hinged pedestal, means for moving the pedestal to operative position, a latch for holding the pedestal in inoperative position, and means disposed above the track and engageable by a wheel on the track for releasing said latch.

5. A lifting device comprising a track, means for supporting the track in inclined position, a hinged pedestal, a spring for moving the pedestal to operative position, a latch for holding the pedestal in inoperative position, and means engageable by a wheel on the track for releasing said latch.

6. A lifting device comprising a track, means for supporting the track in inclined position, a pedestal, a latch for holding the pedestal in inoperative position, and means engageable by a wheel on the track for releasing said latch, and means on said track and engageable by a wheel thereon for releasing the track supporting means.

7. A lifting device comprising a track, means for supporting the track in inclined position, a pedestal, a latch for holding the pedestal in inoperative position, and means engageable by a wheel on the track for releasing said latch, and tiltable means on said track and engageable by a wheel thereon for releasing the track supporting means.

8. A lifting device comprising a track, means for supporting the track in any one of a plurality of inclined positions, and means carried by the track and engageable by a wheel on the track for releasing said supporting means.

9. A lifting device comprising a track, means for supporting the track in any one of a plurality of inclined positions, and tiltable means carried by the track and engageable by a wheel on the track for releasing said supporting means.

10. A lifting device comprising a track, means for supporting the track in any one of a plurality of inclined positions, and a device engageable by a wheel on the track for releasing said supporting means, said releasing device including resilient means for pushing the supporting means free of the track when the track is released thereby.

11. A lifting device comprising a track, means for supporting the track in inclined position, a pedestal, a latch for holding the pedestal in inoperative position, means engageable by a wheel on the track for releasing said latch, and means engageable by a wheel on the track for releasing the track supporting means.

12. A lifting device comprising a track, means for supporting the track in inclined position, a pedestal, a latch for holding the pedestal in inoperative position, and means for releasing said latch.

13. A lifting device comprising a track, means for supporting the track in inclined position, a hinged pedestal, a spring for moving the pedestal to operative position, a latch for holding the pedestal in inoperative position, and means for releasing said latch.

14. A lifting device comprising a track, means for supporting the track in inclined position, and means for releasing said track supporting means, said releasing means including means for pushing the supporting means free of the track when the supporting means is released.

15. A lifting device comprising a track, means for supporting the track in inclined positions, and means on said track for releasing said track supporting means, said releasing means including means for pushing the supporting means free of the track when the supporting means is released.

16. A lifting device comprising a track, means for supporting the track in any one of a plurality of inclined positions, and releasing means for said supporting means, separate from said supporting means and having a portion engageable by the wheel, disposed above the track and in advance of the upper end thereof.

In witness whereof, I have hereunto set my hand this 4th day of June, 1927.

KEMPTON ADAMS.